Figure 1:
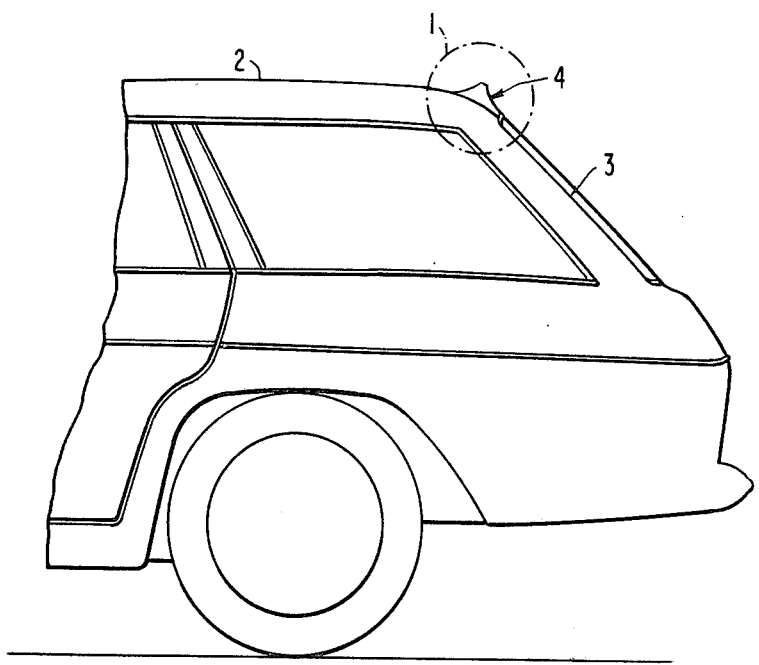

United States Patent [19]

Götz

[11] 4,174,863
[45] Nov. 20, 1979

[54] AIR GUIDE INSTALLATION

[75] Inventor: Hans Götz, Böblingen, Fed. Rep. of Germany

[73] Assignee: Daimler-Benz Aktiengesellschaft, Fed. Rep. of Germany

[21] Appl. No.: 846,256

[22] Filed: Oct. 27, 1977

[30] Foreign Application Priority Data

Oct. 30, 1976 [DE] Fed. Rep. of Germany ....... 2649953

[51] Int. Cl.² .......................................... B62D 37/02
[52] U.S. Cl. ...................................... 296/1 S; 296/91
[58] Field of Search ........................ 296/91, 1 R, 1 S; 244/113, 110 B, 130; 105/2; 180/1 FV

[56] References Cited

U.S. PATENT DOCUMENTS

| | | | |
|---|---|---|---|
| 2,037,942 | 4/1936 | Stalker | 296/1 S |
| 2,877,046 | 3/1959 | Funk | 296/1 S |
| 3,089,728 | 5/1963 | Shumaker | 296/91 |
| 3,215,377 | 11/1965 | Jarecki | 296/91 X |
| 3,427,067 | 2/1969 | Kish | 296/91 X |
| 3,929,369 | 12/1975 | Blain | 296/91 X |

Primary Examiner—Joseph F. Peters, Jr.
Assistant Examiner—Gene A. Church
Attorney, Agent, or Firm—Craig and Antonelli

[57] ABSTRACT

An air-guide installation for motor vehicles, especially station wagons, which is constructed as profile bar that projects from the vehicle outer body panel within the transition area between roof and rear part, extends in the vehicle transverse direction and is effective as spoiler; the profile bar is thereby adapted to be extended away from the outer body panel so that an air-guide channel results between the outer body panel and the bottom side of the profile bar.

21 Claims, 3 Drawing Figures

AIR GUIDE INSTALLATION

The present invention relates to an air-guide installation for motor vehicles, especially for station wagons, which within the transition area between roof and rear part is constructed as profile bar projecting from the vehicle outer body panel, extending in the vehicle transverse direction and effective as spoiler.

It is known to arrange air-guide installations in motor vehicles within the area between the roof and the rear part. However, it is of disadvantage in connection therewith that such guide installations are constructed either only as spoiler in order to reduce the air resistance and to thereby reduce the fuel consumption, or only as air-guide channel in order to keep the rear window as far-reachingly as possible free of dirt above all in corresponding weather conditions.

In contradistinction thereto, the present invention is concerned with the task to provide an air-guide installation with the use of means simple from a structural and manufacturing point of view, which is so constructed that it combines in itself the advantages of the aforementioned two types of constructions.

The underlying problems are solved according to the present invention in that the profile bar is adapted to be extended away from the outer body panel so that an air-guide channel results between the outer body panel and the bottom side of the profile bar.

In realization of the present invention, the extension of the profile bar may be either mechanical or automatic.

According to a further feature of the present invention, the profile bar consists of an elastic material yielding on impact, for example, of a synthetic resinous material of known type and suitable for the intended purposes.

In order to keep low the air resistance, it is of advantage if the profile bar has an approximately trapezoidally shaped cross section.

This is also attainable if the profile bar has an approximately triangularly shaped cross section.

Accordingly, it is an object of the present invention to provide an air-guide installation which avoids by simple means the aforementioned shortcomings and drawbacks encountered in the prior art.

Another object of the present invention resides in an air-guide system for motor vehicles, especially for station wagons, which can be effective as spoiler and also as air-guide channel.

A further object of the present invention resides in an air-guide installation which effectively combines the advantages of a spoiler and of an air-guide channel, yet is simple in construction and easy to operate.

Still a further object of the present invention resides in an air-guide installation which effectively reduces the air resistance in one position thereof and is effective as an air-guide system in another position thereof so as to keep the rear window of a motor vehicle, especially of a station wagon as free from dirt as possible.

Figure 2:
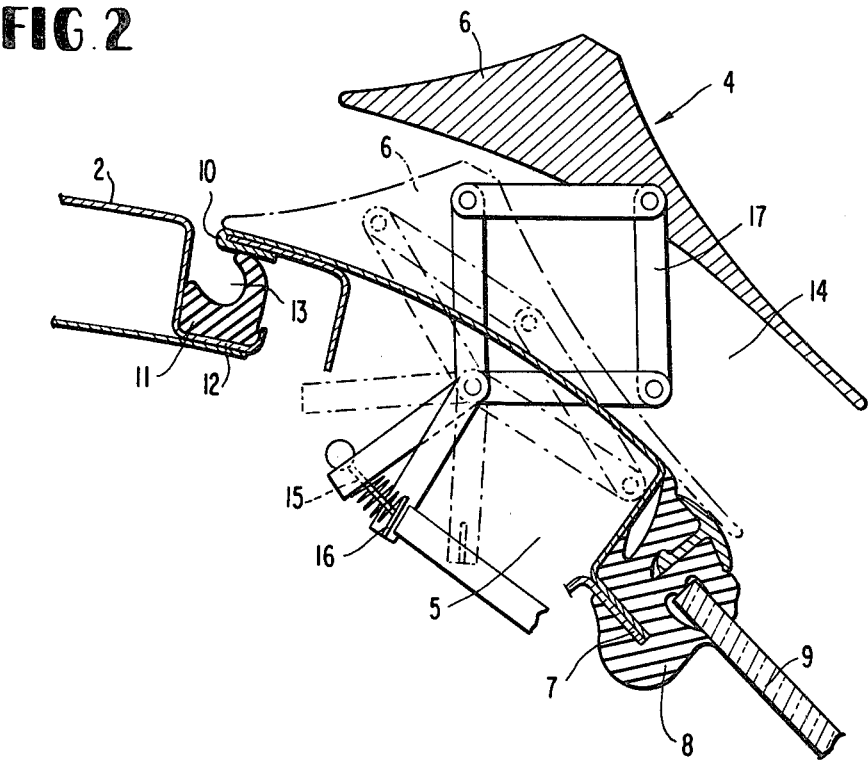
Figure 3:
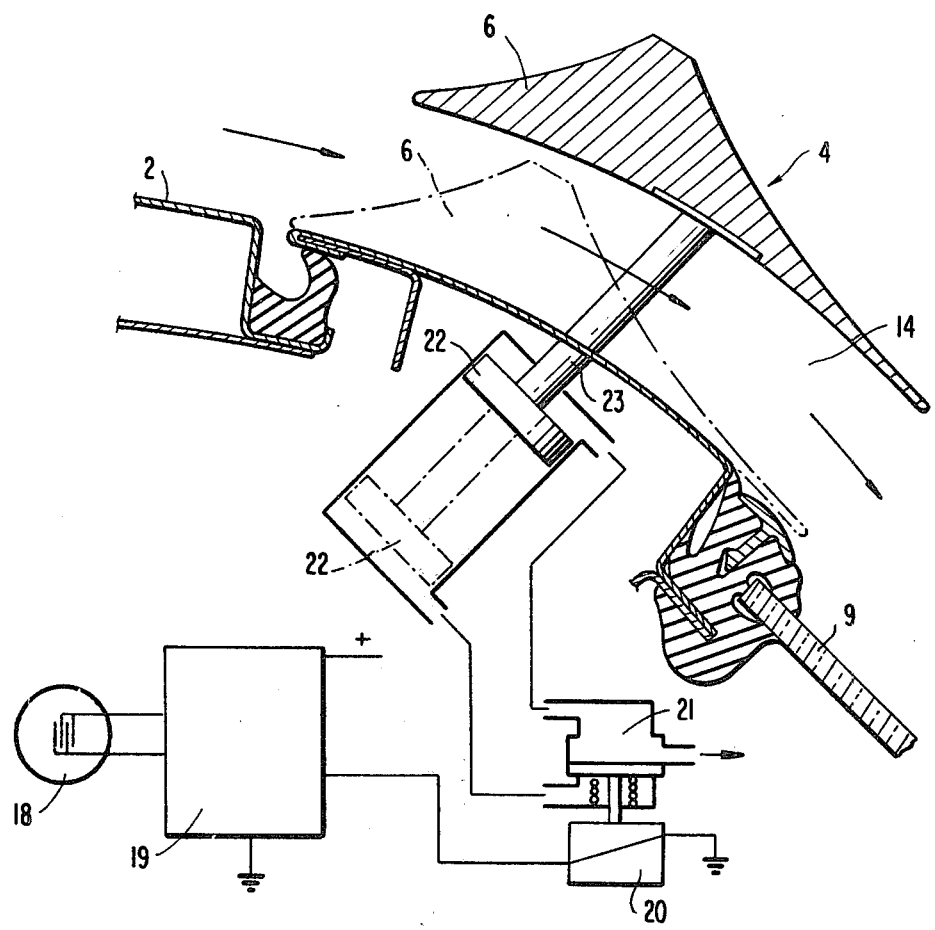

These and other objects, features and advantages of the present invention will become more apparent from the following description when taken in connection with the accompanying drawing which shows, for purposes of illustration only, two embodiments in accordance with the present invention, and wherein:

FIG. 1 is a schematic side elevational view of the rear part of a station wagon equipped with an air-guide installation in accordance with the present invention;

FIG. 2 is a cross-sectional view, on an enlarged scale, through the air-guide installation in accordance with the present invention equipped with a mechanical actuation, the cross section being taken in the vehicle longitudinal direction; and FIG. 3 is a cross-sectional view through a modified embodiment of an air-guide installation in accordance with the present invention, similar to FIG. 2 but with automatic actuation.

Referring now to the drawing wherein like reference numerals are used throughout the various views to designate like parts, the motor vehicle illustrated in FIG. 1 includes within the transition area 1 between the roof 2 and the rear portion 3 which, as a rule, includes a door or a tailgate, an air-guide installation generally designated by reference numeral 4 which is in its lower position in FIG. 1 and is therefore effective as spoiler to reduce the air resistance and to save fuel.

FIG. 2 illustrates the air-guide installation 4 integrated into the rear roof planking, which consists of a cross girder 5 constructed as hollow profile member of a tailgate and of a profile bar 6 arranged thereon.

The flange 7 of the cross girder 5 is enclosed by an edge seal 8 which simultaneously encloses the upper edge of the rear window 9. The flange 10 of the cross girder 5 on the side of the roof rests on a sealing lip of the profile seal 11 which is adhesively secured within a U-shaped channel or groove 12 of the rear planking of the roof 2. The hollow space 13 formed thereby serves for the reception and lateral drainage of the rain water running off from the roof planking partly toward the rear, especially when the vehicle is under way, i.e., is being driven.

By extending the profile bar 6 from the initial position shown in FIGS. 2 and 3 in dash and dotted lines into the end position illustrated in full lines, an air-guide channel 14 results between the outer body panel and the bottom side of the profile bar 6, which may extend over the entire roof width. A part of the air flowing off from the roof 2 in the direction of the arrow is thereby forcibly deflected through the thus formed air guide channel 14 in the direction toward the rear window 9, when the vehicle is in motion, whence the rear window soiling known with all station wagons is most far-reachingly prevented.

The movement of the profile bar 6 from the starting position into the end position and back takes place in the illustrated embodiment of FIG. 2 by means of a Bowden cable which is pivotally connected at points 15 and 16 at a scissor lever 17, whereby the profile bar 6 is retained by guide webs (not shown) which are arranged lowerable within the lateral area of the rear door joints.

An automatic actuation of the air-guide installation 4 is illustrated in FIG. 3 whereby the extension and retraction takes place by way of a moisture sensor 18 which is arranged, for example, in the wheel casing or at a place in the vehicle adapted to be similarly acted upon rapidly with water, preferably in the rear area. As a result thereof, a solenoid valve 20 is actuated by way of a relay in the switching stage 19, which alternately displaces a piston 22 having a piston rod 23 which is secured at the profile bar 6, by way of a control element 21 dependent on the vacuum in the suction pipe of the internal combustion engine.

The profile bar 6 of the air-guide installation 4 consists of an elastic, impact-yielding material, for example, of a suitable synthetic resinous material, and has an approximately trapezoidally shaped or triangularly shaped cross section, from which results a considerably smaller air resistance increase especially in the extended condition.

In the control case, one may start with the assumption that when driving on wet roads, the profile bar 6 is extended for the formation of an air-guide channel 14 for purposes of keeping clean the rear window 9. In contradistinction thereto, when driving on dry roads, the profile bar 6 remains in its starting position in order to be able to act as spoiler.

While I have shown and described only two embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. An air-guide installation for motor vehicles, comprising profile bar means arranged at a vehicle outer body panel means within a transition area between a roof of the motor vehicle and rear portion thereof and extends in a vehicle transverse direction, characterized in that the profile bar means is effective as a spoiler for reducing air resistance in a first position wherein a bottom side of the profile bar means contacts the vehicle outer body panel means within the transition area and projects outwardly therefrom, and in that means are provided for selectively displacing the profile bar means from the first position to a second extended position away from the outer body panel means in the transition area so that an air-guide channel results between the outer body panel means and the bottom side of the profile bar means.

2. An air-guide installation according to claim 1, characterized in that said displacing means includes mechanical means for extending the profile bar means.

3. An air-guide installation according to claim 1, characterized in that said displacing means includes automatic means for extending the profile bar means.

4. An air-guide installation according to claim 1, characterized in that the profile bar means is made of an elastic, impact-yielding material.

5. An air-guide installation according to claim 4, characterized in that said material is a synthetic resinous material.

6. An air-guide installation according to claim 1, characterized in that the profile bar means has an approximately trapezoidally shaped cross section.

7. An air-guide installation according to claim 1, characterized in that the profile bar means has an approximately triangularly shaped cross section.

8. An air-guide installation according to claim 1, characterized in that the motor vehicle is a station wagon having a tailgate or rear door, and in that the air-guide installation is provided within the area of transition between the roof and the tailgate or rear door.

9. An air-guide installation according to claim 8, characterized in that the profile bar means is made of an elastic, impact-yielding material.

10. An air-guide installation according to claim 9, characterized in that the profile bar means has an approximately trapezoidally shaped cross section.

11. An air-guide installation according to claim 9, characterized in that the profile bar means has an approximately triangularly shaped cross section.

12. An air-guide installation according to claim 9, characterized in that said displacing means includes mechanical means for extending the profile bar means.

13. An air-guide installation according to claim 9, characterized in that said displacing means includes automatic means for extending the profile bar means.

14. An air-guide installation according to claim 1, characterized in that the motor vehicle is a station wagon having a tailgate and a rear window, the roof of the station wagon terminates in a channel in the transition area, a hollow profile member is interposed between the channel and the rear window, said profile bar means being mounted at said hollow profile member.

15. An air-guide installation according to claim 14, characterized in that drainage means are provided in said channel for receiving and laterally draining moisture running off the roof.

16. An air-guide installation according to claim 15, characterized in that said drainage means includes a profile sealing member disposed between a flange of the hollow profile member and the channel.

17. An air-guide installation according to claim 15, characterized in that the hollow profile member forms an upper portion of the tailgate, and in that an edge seal enclosing a further flange of the profile member is arranged between the profile member and the rear window.

18. An air-guide installation according to claim 17, characterized in that said displacing means includes mechanical means for extending the profile bar means.

19. An air-guide installation according to claim 17, characterized in that said displacing means includes automatic means for extending the profile bar means.

20. An air-guide installation according to claim 19, characterized in that said automatic means includes a moisture sensor means for detecting the presence of moisture on the road.

21. An air-guide installation for motor vehicles, comprising profile bar means which is effective as a spoiler, projects from the vehicle outer body panel means within the transition area between roof and rear portion and extends in the vehicle transverse direction, characterized in that automatic means are provided for operably extending the profile bar means away from the outer body panel means so that an air-guide channel results between the outer body panel means and the bottom side of the profile bar means, the automatic means includes a moisture sensor means for detecting the presence of moisture on the road.

* * * * *